United States Patent [19]

Butner et al.

[11] Patent Number: 4,936,528

[45] Date of Patent: Jun. 26, 1990

[54] METHOD AND APPARATUS FOR ORBITAL DEBRIS MITIGATION

[75] Inventors: Cyrus L. Butner, Reston, Va.; Charles Gartrell, Gaithersburg, Md.

[73] Assignee: General Research Corporation, Vienna, Va.

[21] Appl. No.: 192,731

[22] Filed: May 11, 1988

[51] Int. Cl.$^5$ ............................ B64G 1/00; B64G 1/56
[52] U.S. Cl. ................................................ 244/158 R
[58] Field of Search ................... 244/158 R, 159, 161; 60/39.092, 204, 261; 55/226, 462, 464, 521, 306

[56] References Cited

U.S. PATENT DOCUMENTS

| | | | |
|---|---|---|---|
| 2,782,933 | 2/1957 | Monsarrat | 55/521 |
| 2,835,340 | 5/1958 | McGuff et al. | 55/521 |
| 2,928,497 | 3/1960 | Stockdale | 60/39.092 |
| 3,292,044 | 12/1966 | Klahr . | |
| 3,700,488 | 10/1972 | Hoff | 117/94 |
| 3,768,254 | 10/1973 | Stuart | 60/204 |
| 3,896,758 | 7/1975 | Di Battista | 116/114 |
| 3,898,068 | 8/1975 | McNeil | 55/462 |
| 4,072,309 | 10/1987 | Frank | 244/163 |
| 4,144,041 | 3/1979 | Hou | 55/226 |
| 4,158,449 | 6/1969 | Sun et al. | 60/39.092 |
| 4,314,682 | 2/1982 | Barnett et al. | 244/158 |
| 4,572,285 | 2/1986 | Botts et al. | 244/163 |
| 4,699,339 | 10/1987 | Rosen et al. | 244/158 |
| 4,750,692 | 6/1988 | Howard | 244/158 R |
| 4,754,601 | 7/1988 | Minoutel | 60/266 |

OTHER PUBLICATIONS

Spectrum, "Chilly Solution for Litterbirding", (Penn State May), Pre 1978.
Lovece, "The Impending Crisis of Space Debris", Astronomy, Aug., 1987, pp. 6–13.
Booda, "Space Plane Grows into Family of Concepts", Aviation Week, 6-19-61, pp. 54–55, 59–62.
Reisch, M. S., "High-Performance Fibers Find Expanding Military, Industrial Uses," Chemical & Engineering News, Feb. 2, 1987, pp. 9–14.
NASA Space Systems Technology Model, Sixth Edition, NASA TM 88174, NASA Office of Aeronautics and Space Technology, Jun. 1985, pp. 2-11, through 2-13.
Hargrove, Eugene C., "Earth Orbital Pollution", Beyond Spaceship Earth, Sierra Club Books, pp. 47–65.
Kessler, D. J., "Sources of Orbital Debris and the Projected Environment of Future Spacecraft", J. Spacecraft, vol. 18, No. 4, Jul.–Aug. 1981, pp. 357–360.
Taft, L. G., "Satellite Debris: Recent Measurements", J. Spacecraft, vol. 23, No. 3, May–Jun. 1986, pp. 342–346.
Temple, L. Parker, III, "The Impact of Space Debris on Manned Space Operations", pp. 85–90.

(List continued on next page.)

Primary Examiner—Galen Barefoot
Attorney, Agent, or Firm—Griffin, Branigan & Butler

[57] ABSTRACT

Method and appartus are provided for mitigating orbital debris by using a collision medium to promote hyper-velocity collisions with orbital debris, and to trap any debris remaining after said collision in a manner whereby the remaining debris is retrievable. In a first embodiment, the collision medium comprises streams of liquid droplets which are directed proximate the interior of an intake cone (30) toward a collector (34). As hyper-velocity orbital debris collides with the stream or droplets comprising the collision medium, the orbital debris is substantially vaporized. The stream further serves to entrain any residual debris remaining after the collision, and to usher the residual debris to the collector (34) wherein both the stream and the residual debris are collected. In another embodiment, the collision medium comprises a plurality of filaments (430, 434, 436, 438) mounted on a substrate (414). The plurality of filaments and (430, 434, 436, 438) and the substrate (414) upon which the filaments (430, 434, 436, 438) are mounted comprise a mitigation unit which is, in turn, removably mounted on a superstructure (400). The filaments (430, 434, 436, 438) are oriented to facilitate hyper-velocity collisions and to trap any debris remaining after the collisions.

27 Claims, 8 Drawing Sheets

OTHER PUBLICATIONS

Johnson, Nicholas L., "Preventing Collisions in Orbit": *Space*, vol. 3, No. 2, pp. 17–19.

Hechler, Martin, and Van der Ha, Jozef C., "Probability of Collisions in the Geostationary Ring", *J. Spacecraft*, vol. 18, No. 4, Jul.–Aug. 1981, pp. 361–366.

Mattick, A. T., and Hertzberg, A., "Liquid Droplet Radiators for Heat Rejection in space", *J. Energy*, vol. 5, No. 6, Nov.–Dec. 1981, pp. 387–393.

Taussig, Robert T., and Mattick, A. T., "Droplet Radiator Systems for Spacecraft Thermal Control", J. Spacecraft, vol. 23, No. 1, Jan.–Feb. 1986, pp. 10–17.

Muntz, E. P., and Dixon, Melissa, "Applications to Space Operations of Free-Flying, Controlled Streams of Liquids", *J. Spacecraft*, vol. 23, No. 4, Jul.–Aug. 1986, pp. 411–419.

Wierzbicki, Tomasz, and Yue, Dick K., "Impact Damage of the Challenger Crew Compartment", *J. Spacecraft*, vol. 23, No. 6, Nov.–Dec. 1986, pp. 646–654.

Asada, Noriaki, "Fine Fragments in High-Velocity Impact Experiments", *Journal of Geophysical Research*, vol. 90, No. B14, Dec. 10, 1985, pp. 12,445–12,453.

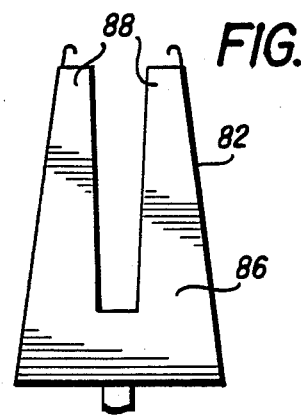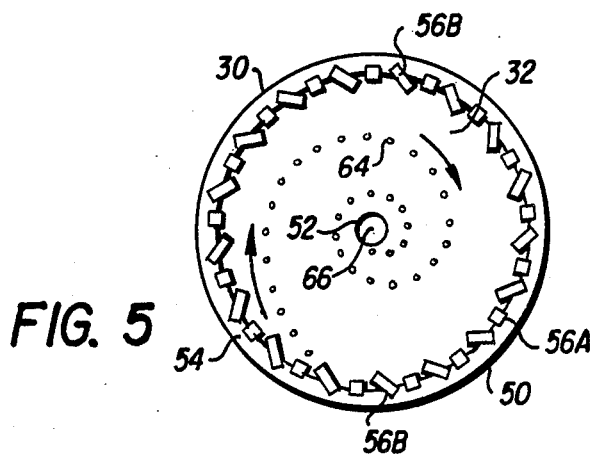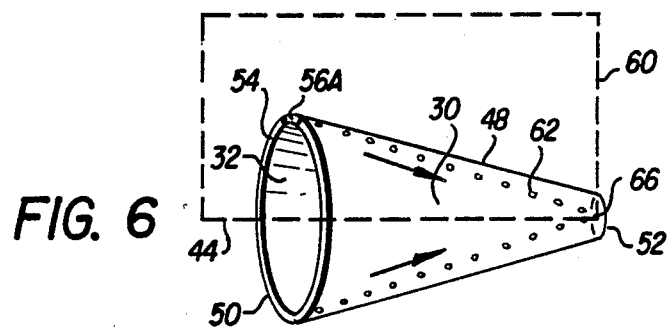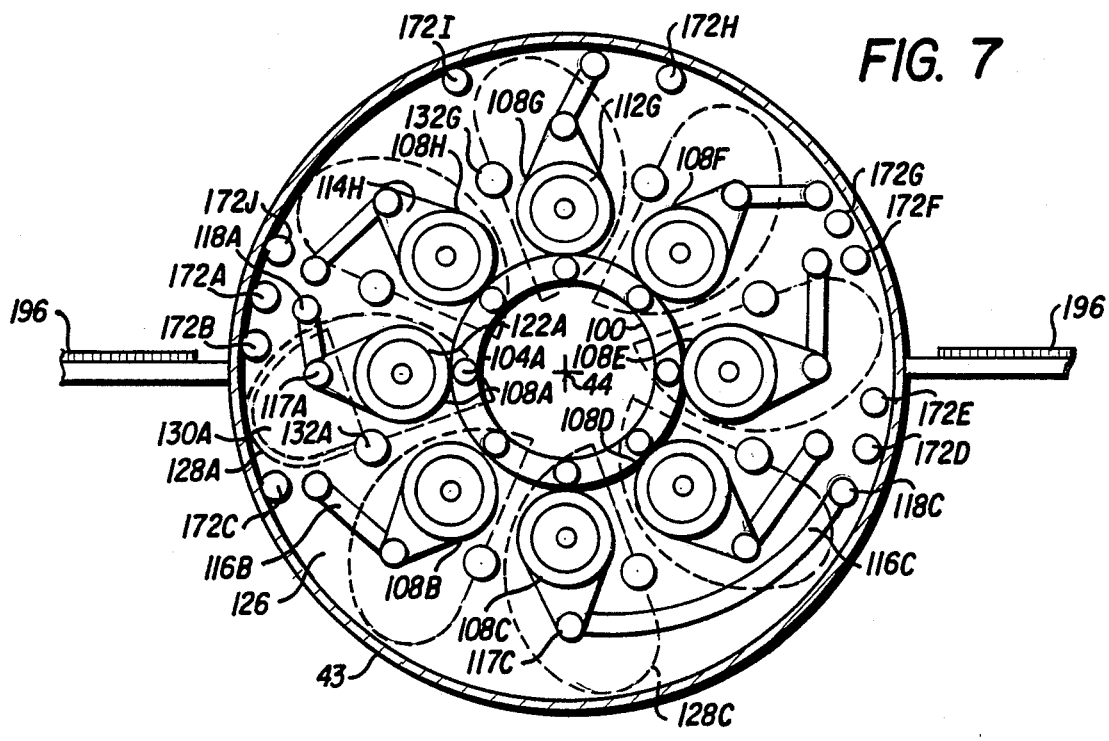

U.S. Patent    Jun. 26, 1990    Sheet 6 of 8    4,936,528
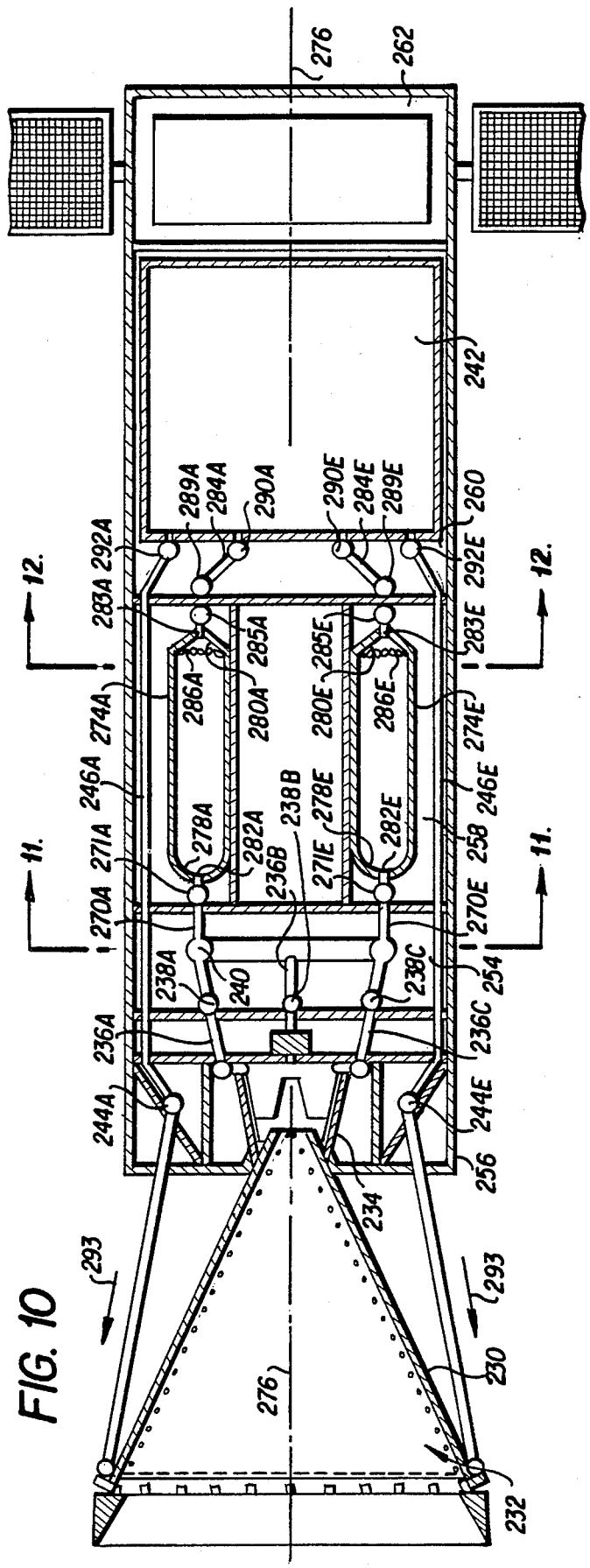
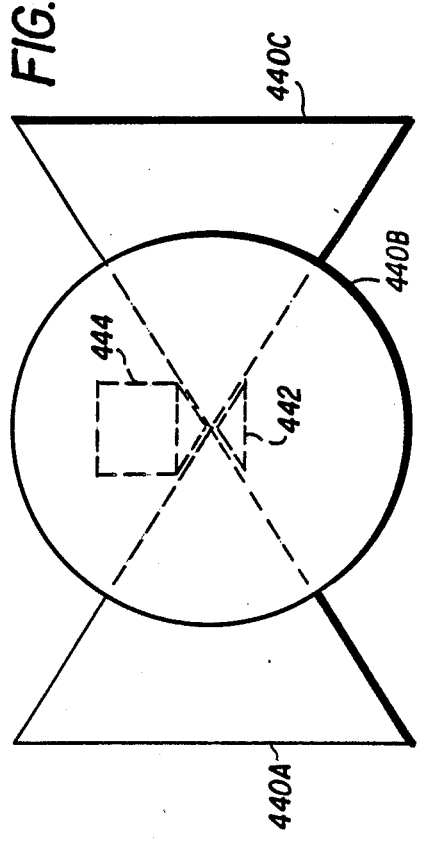

METHOD AND APPARATUS FOR ORBITAL DEBRIS MITIGATION

BACKGROUND OF THE INVENTION

I. Field of the Invention

This invention relates to method and apparatus for removing debris and pollution from outer space, particularly types of debris and pollution that are injurious to spacecraft and astronauts.

II. Prior Art and Other Considerations

Early science fiction writers prophesied hat meteors would pose a penetrating if not a crushing threat to space travel. After three decades of space exploration and travel, it appears that a greater threat is posed, not by large hurling meteors, but by micrometeriods and small particles having a size in a range from 0.01 cm to 1.0 cm. Scientist now tend to believe that large objects are too few in space to produce significant impact probabilities. Moreover, large objects are more easily observable, and can be potentially tracked and avoided.

In his exploration and conquest of outer space, man has regrettably compounded the amount of particulate matter in space by contributing man-made debris and pollution. The sources of human-generated space debris are described in the literature as including satellite and rocket break-up, particulate matter occasioned by the firing of rocket motors, by-products of stage separation operations, and the flaking of spaceship coatings (see, for example, Hargrove, Eugene C., "Earth Orbital Pollution", *Beyond Spaceship Earth*, Sierra Club Books, pp. 47–65, and Kessler, D. J., "Sources of Orbital Debris and the Projected Environment for Future Spacecraft", J. Spacecraft, Vol. 18, No. 4, July–August 1981, pp. 357–360).

As used hereinafter, the term orbital debris refers to both naturally-occurring and human-generated particles in orbit around the Earth.

Orbital debris in the size range from 0.01 cm to 1.0 cm has sufficient mass to damage or penetrate satellites, spacecraft, space suits, and large space structures. There is also sufficient number densities of debris particles of this size to produce significant damage probabilities, with future densities expected to increase. Orbital debris also increases background noise for optical and infrared measurements.

In order to survive the compounding proliferation of orbital debris, future spacecraft and space stations must be more durably designed, thereby undesirably increasing weight and cost parameters. Likewise, space suits will require greater bulk or will be retired after shorter lifetimes. Despite increased shielding, the risk of damage to, or loss of, spacecraft will nevertheless be greater.

Present efforts directed to the problems of orbital debris are primarily confined to the characterization and analysis of the debris or to the advocacy of precautionary measures to minimize situations or conditions that might give rise to further debris.

It is therefore, an object of the present invention to provide method and apparatus for removing orbital debris of a critical size range from outer space.

An advantage of the present invention is the provision of method and apparatus for protecting spacecraft, space structures, and space suits from orbital debris by decreasing levels of orbital debris, or by shielding them from debris collisions.

Another advantage of the present invention is the provision of method and apparatus for actively decreasing levels of debris-induced background noise which would otherwise degrade optical and infrared measurements.

A further advantage of the present invention is the provision of method and apparatus which could obviate other forms of enhanced shielding of spacecraft, space structures, and space suits.

SUMMARY

Method and apparatus are provided for mitigating orbital debris by using a collision medium to promote hyper-velocity collisions with orbital debris, and to trap any debris remaining after said collision in a manner whereby the remaining debris is retrievable.

In a first embodiment, the collision medium comprises streams of liquid droplets which are directed along the interior of an intake cone toward a collector. Some streams are emitted and directed in such a manner that they have a primarily conically spiraling component proximate the interior of the cone; other streams are emitted and directed to have a primarily diagonal component. As hyper-velocity orbital debris collides with the stream of droplets comprising the collision medium, the orbital debris is substantially vaporized. The stream further serves to entrain any residual debris remaining after the collision, and to usher the residual debris to the collector wherein both the liquid and the residual debris are collected.

After collection of the liquid and residual debris, the residual debris and liquid are separated to facilitate storage of the residual debris. In one embodiment, after separation from the liquid, the residual debris is directed to a selected one of a plurality of storage receptacles. After the residual debris is separated therefrom, the liquid is recirculated to the intake cone for repeated use as the collision medium. The storage receptacles are replaceable by servicing spacecraft. In another embodiment, a storage tank containing the residual debris is capable of being propelled back to the atmosphere of the Earth for disintegration.

In another embodiment, the collision medium comprises a plurality of filaments mounted on a substrate. The plurality of filaments and the substrate upon which the filaments are mounted comprise a mitigation unit. The mitigation unit is, in turn, removably mounted on a superstructure. The filaments are oriented to facilitate hyper-velocity collisions and to trap any debris remaining after the collisions. The residual debris is substantially trapped between filaments, between one or more filaments and the substrate, or internal to the substrate. A mitigation unit with residual debris trapped therein can be removed from the superstructure and replaced with a fresh mitigation unit. A plurality of mitigation units are connectable or linkable together in a variety of configurations to achieve greater debris mitigation over a broader spatial territory.

Orbital debris mitigation systems utilizing either liquid droplets or filaments as the collision medium can be used in either of two modes. In one mode, an orbital debris mitigation system is constructed as the major payload of a free-flying spacecraft, capable of independent navigation. Such a spacecraft can be placed in a desired orbit and left there to sweep debris from a desired region of space; it can be maneuvered among a number of desired orbits to sweep debris from a desired region of space; or it can be maneuvered into position to co-orbit with another spacecraft or space structure as a free-flying debris shield. Such a shield would be a valuable protection system in the event of a debris-creating accident in the vicinity of an important space structure. In the other mode, a debris mitigation system is constructed as an integral part of the outer structure of the space facility to be protected from debris. In this mode, the mitigation systems functions as a protective "skin" on the facility, and does not include the spacecraft-related systems necessary for it to be a free-flyer.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4 is a side view of a rotor vane of a collector unit included in the orbital debris mitigation system of the embodiment of FIG. 1;

FIG. 5 is a left end view of an intake cone of the orbital debris mitigation system of the embodiment of FIG. 1, further showing streams of droplets having a conically spiralling directional component;

FIG. 6 is a front perspective view of an intake cone of the orbital debris mitigation system of the embodiment of FIG. 1, further showing streams of droplets having a diagonal directional component;

FIG. 7 is a sectional view of the orbital debris mitigation system of the embodiment of FIG. 1 taken along the line 7—7 of FIG. 2;

FIG. 10 is a cross-sectional view of an orbital debris mitigation system according to another embodiment of the invention;

FIG. 16 is a side schematic view showing an arrangement of a plurality of mitigation cones according to an embodiment of the invention;

FIG. 17 is a top schematic view of the arrangement of FIG. 16;

DETAILED DESCRIPTION OF THE DRAWINGS

Structure: Fluid Embodiments

Figure 1:
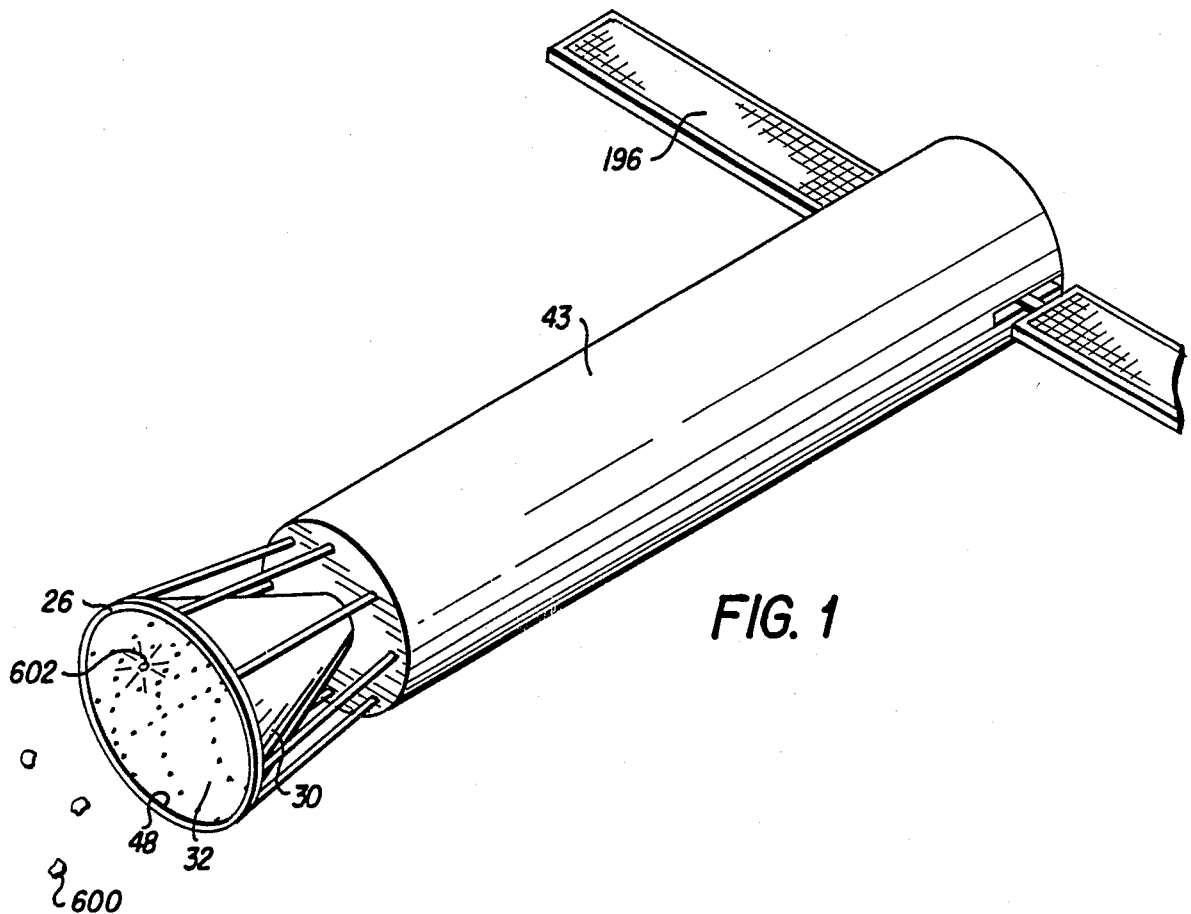
FIG. 1 is an isometric view of an orbital debris mitigation system according to a first embodiment of the invention.

FIG. 1 shows an orbital debris mitigation system according to a first embodiment of the invention. The orbital debris mitigation system of the embodiment of FIGS. 1 and 2 comprises a structure, such as cone 30, for defining an intake or collision region 32; a collector unit 34; a separator unit 36; a residual debris storage unit 38; a fluid reservoir unit 40; and, a satellite control unit 42. The collector unit 34; the separator unit 36; the residual debris storage unit 38; the fluid reservoir unit 40; and, the satellite control unit 42 are substantially enclosed in an essentially cylindrical satellite housing 43. The satellite housing 43 has a major cylindrical axis 44.

As explained in more detail hereinafter, streams of fluid droplets are directed proximate an interior surface of the intake cone 30 toward the collector unit 34. The streams of fluid droplets serve as a collision medium when orbital debris travelling at hyper-velocity speeds collide with the droplets comprising the streams. Upon collision, the debris is substantially vaporized, with any residual debris remaining after the collision being entrained in the stream and directed to the collector unit 34. As used herein, the term "substantially vaporized" includes complete vaporization of debris. The residual debris is separated in the separator unit 36 from the fluid stream so that the residual debris can be contained within the storage unit 38 and so that the fluid can be recycled via the fluid reservior unit 40 and main nozzle supply pumps 174 for reuse as the collision medium.

In the preferred embodiment, the structure defining the intake region 32 is essentially a truncated hollow cone 30. Cone 30 is comprised of a funnel-shaped wall 48 fabricated from any suitable space material. Wall 48 thus forms a boundary for the bounded intake region 32. An open base or mouth 50 is provided at the large end of the cone 30. The cone 30 is truncated just short of its apex to provide an essentially circular, open inlet 52 into the collector unit 34 connected thereto.

Fluid discharge means are provided on a circular manifold 54 which extends around the periphery of the cone open mouth 50. In particular, a plurality of nozzles 56 are in communication with the manifold 54. The nozzles 56 emit and direct streams of fluid droplets into the intake region 32 so that the streams travel from the nozzles 56 to the collector unit 34.

To protect the circular manifold 54 and the nozzles 56 from direct and unobstructed collisions with orbital debris, a circular impact shielding ring 57 is attached to cone 30 along the circumference of its open mouth 50. The shielding ring 57 has an essentially triangular cross section, and its interior is constructed of parallel sheets 58 which are separated by gaps 59 between successive sheets 58. The interior arrangement of sheets 58 resembles a stack of circular rings of regularly varying width. The apex of the triangular cross section of the circular shielding ring 57 faces away from the cone 30, and the base of the shielding ring is proximate to the cone 30.

Some of the nozzles 56, labeled as nozzles 56A, are oriented so that the streams emitted therefrom have a primarily diagonal directional component. That is, as shown in FIG. 6, a stream emitted from a nozzle 56A travels a path that is essentially the intersection of a partial plane (such as plane depicted by broken line 60 in FIG. 6) and a conical surface of rotation. One such intersection is represented by broken line 62 shown in FIG. 6. Streams emitted from nozzles 56A are spaced away from the cone wall 48 and converge at a focal point 66 just inside the collector unit 34, just past the open collector inlet 52 and on the axis 44 which is central to the cone 30, the inlet 52, and the collector unit 34. It is the purpose of these diagonally-directed streams to serve as a collision and entrainment medium, and to protect the collector unit 34 and cone wall 48 from direct and unobstructed collisions with orbital debris.

Other nozzles, such as nozzles labeled 56B, are oriented so that the streams emitted therefrom have a primarily conically spiraling directional component (such as the path traced by broken line 64 of FIG. 5). Streams emitted from nozzles 56B travel in contact with the cone wall 48 and enter the collector unit 34 through the open inlet 52. It is the purpose of these spiraling streams to serve as a collision and entrainment medium, and to protect the cone wall 48 from direct and unobstructed collisions with orbital debris.

Figures 2, 19:
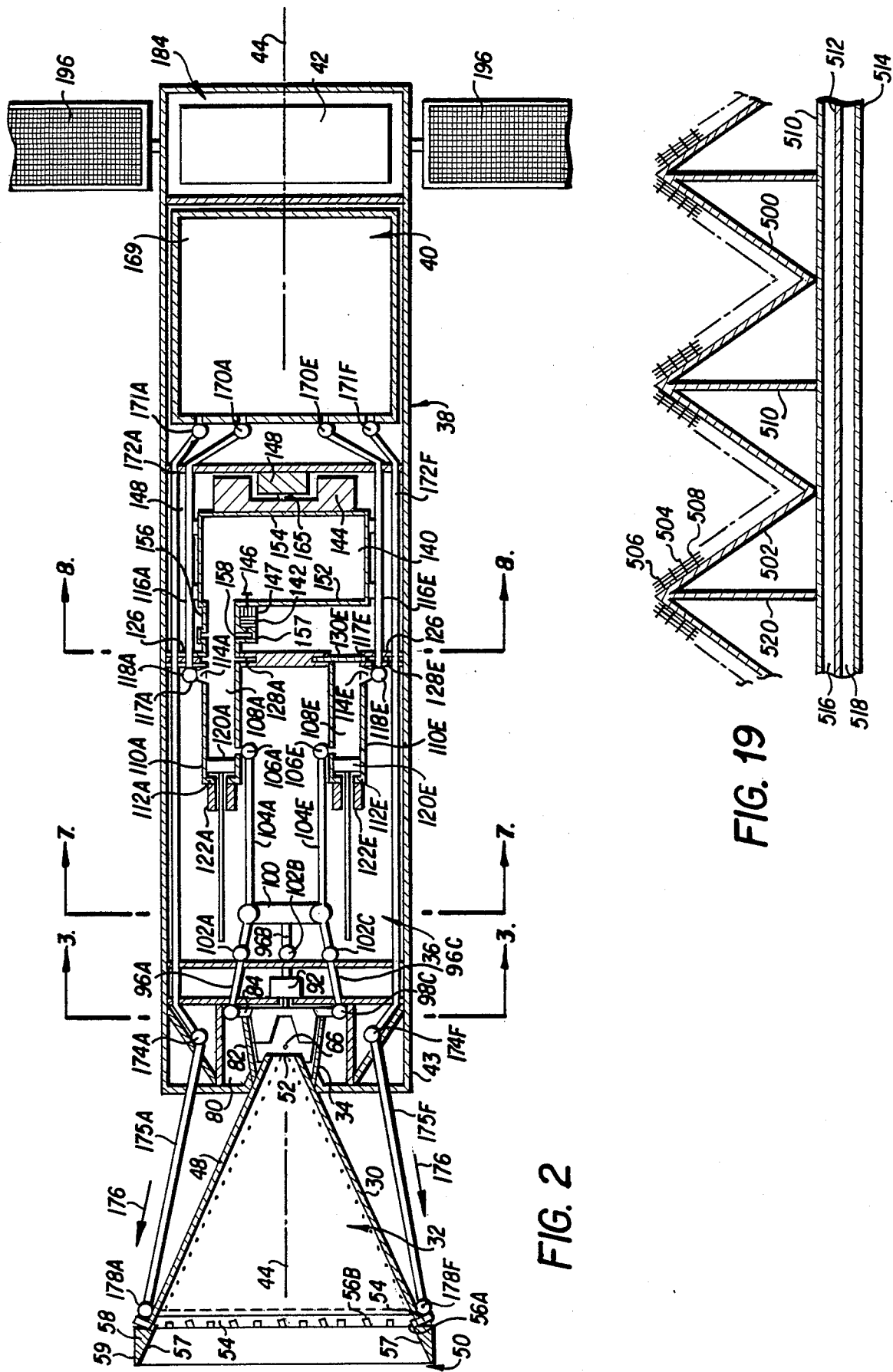
FIG. 2 is a cross-sectional view of the orbital debris mitigation system of the embodiment of FIG. 1.

The nozzles 56 are arranged in alternating orientational sequence about the circular manifold 54. The exact number and sequence of the nozzles 56 are dependent on the dimensions of the cone 30 and liquid droplets, and are selected to provide the number of streams necessary to adequately cover the cone wall 48 and the collector inlet 52, and to optimize the collisional cross section presented by the two types of streams. One possible sequence; i.e., 56A, 56B, 56A, 56B, and so forth is shown in FIGS. 2 and 5.

The nozzles 56 are of the type that permit control of the size of the droplets emitted therefrom. Examples of such nozzles are those that employ piezoelectric elements to emit precisely sized droplets.

The collector unit 34 is substantially disposed in a compartment 80 centrally located at the left end of the satellite housing 43. The collector inlet 52 lies on the major cylindrical axis 44 of the satellite housing. The collector unit 34 is comprised of a rotatable bucket 82 having multiple fins centrally attached therein and a slurry collector manifold ring 84. In the embodiment shown in FIGS. 3 and 4, the bucket 82 contains four vanes 86, with each vane 86 providing two fins 88. The bucket 82 is mounted on a shaft 90 that is rotatably driven by collector motor 92.

The collector bucket 82 has a plurality of ports 94 arranged about the periphery of the bottom thereof. A port 94 is located at the base of each fin 88, on the side of the fin 88 facing the direction of rotation (shown by arrow 95 in FIG. 3) of the collector bucket 82. The truncated conical shape of the bucket 82, the shape and placement of the fins 88 inside the bucket 82, and the placement of the ports 94 in the bucket 82 act together when the bucket 82 is rotated to force the collected liquid and residual debris out of the collector bucket 82 and into the slurry collector manifold ring 84.

Figure 3:
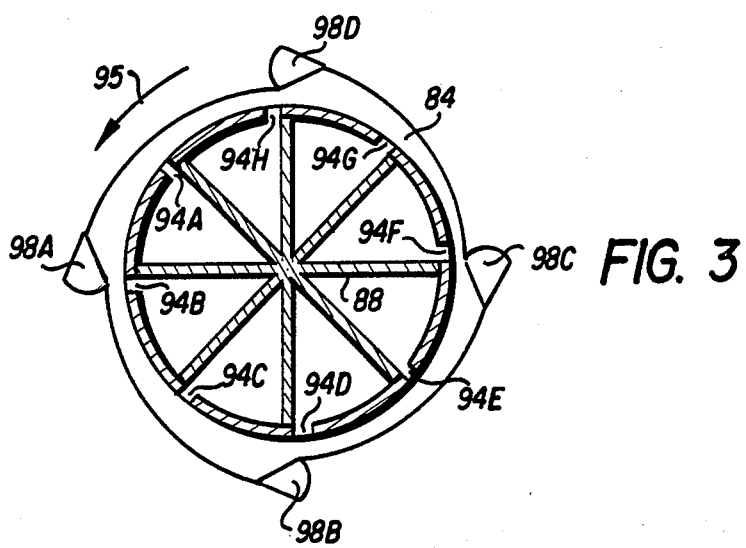
FIG. 3 is a sectional view of a collector unit of the orbital debris mitigation system of the embodiment of FIG. 1 taken along the line 3—3 of FIG. 2.

The collector manifold ring 84 is sealed to prevent liquid and residual debris from leaking out around the exterior of the bucket 82. The collector manifold ring 84 has four outlet orifices, each orifice being connected to a corresponding one of four pipes 96A through 96D. Between each of the four manifold outlet orifices and the inlet of its corresponding pipe 96A through 96D, is connected one of four manifold outlet valves 98A through 98D. Valves 98 allow selective use of each of pipes 96, and allow isolation of the collector unit 34 from the separator unit 36 in the event of a system shutdown or emergency. A particular configuration is shown in FIG. 3, in which eight fins 88 and eight ports 94 are used for the collector bucket 82. The collector manifold ring 84 and its four outlet orifices and corresponding valves 98 are also shown in FIG. 3. The pipes 96 convey a slurry of liquid and residual debris into the separator unit 36.

In the separator unit 36 the four pipes 96 are connected to corresponding inlet orifices of a circular manifold ring 100. Upstream from its connection to the manifold ring 100, each pipe 96 has an auxiliary pump 102 connected thereto to operate, if need be on the slurry conveyed therethrough. The manifold ring 100 has eight outlet orifices, each orifice being connected by a distribution pipe 104 and an associated separator inlet valve 106 to a corresponding separator chamber 108. For example, a first orifice of manifold ring 100 selectively communicates through distribution pipe 104A and inlet valve 106A with separator chamber 108A. Thus, eight separator chambers 108A through 108H are provided in the separator unit 36. The separator inlet valves 106 permit the selective use and isolation of each of the eight separator chambers 108; thusly allowing the use of only some of the separator chambers 108 at any one time, and providing redundancy for emergencies and chamber cleaning. As seen in FIG. 7, the separator chambers 108A through 108H are arranged in an essentially circular pattern about the major cylindrical axis 44.

Each separator chamber 108 of the separator unit 36 comprises an essentially hollow cylindrical chamber. Each separator chamber 108 has a cylindrical side wall 110 and an end wall 112. A corresponding distribution pipe 104 with its associated separator inlet valve 106 communicates with the separator chamber 108 at a point on the cylindrical side wall 110 which is nearest the major cylindrical axis 44 of the satellite housing 43. Each separator chamber 108 has a slot in its side wall 110 at a point which is furthermost from the major cylindrical axis 44 of the housing 43. A filter medium 114 is securely mounted in the side wall slot of each separator chamber 108. As described hereinafter, for each separator chamber 108 the filter medium 114 permits the passage of liquid therethrough into an outlet pipe 116. Each outlet pipe 116 has a separator outlet valve 117 associated therewith proximate the point at which the pipe 116 is sealed to the exterior of the cylindrical side wall 110. Each outlet pipe 116 has a separator outlet pump 118 associated therewith downstream from the separator outlet valve 117 to operate on the liquid conveyed therethrough. The separator outlet pipes 116 and outlet pumps 118 are arranged such that the outlet pipes 116 will not obstruct the ejection path of the residual debris storage tank 140 as they pass through the residual debris storage unit 38 on their way to the fluid reservoir unit 40.

The end wall 112 of each separator chamber 108 has a piston 120 extending therethrough. Each piston is displaceable under the control of an activator 122 along a direction parallel to the major axis 44. In the illustrated embodiment, the activator 122 and its associated piston 120 function as a solenoid. The activator 122 can also function as a motor, pressing on, or engaging with, the piston 120 to move it within the separator chamber 108.

The satellite housing 43 includes a disc-shaped partition 126 which extends transversely to the major axis 44 in such a manner to sealingly abut the side walls 110 of the separator chambers 108 at the end of the chambers 108 opposite the chamber end wall 112. The partition 126 has eight aperatures formed therein. These eight aperatures are aligned with the major cylindrical axes of the respective separator chambers 108. The partition 126 has eight internal grooves 128 formed therein. Each groove 128 accommodates a displaceable gate 130 for the separator chamber 108 with which it is associated. Each gate 130 is controlled by an activator 132 so that the gate 130 is rotationally displaceable to seal the separator chamber 108 from the residual debris storage unit 38.

The residual debris storage unit 38 of the orbital debris mitigation system of the embodiment of FIG. 2 comprises a residual debris storage tank 140; a storage tank closure activator 142; a tank turntable 144; a tank ejector system 145; a piston scraper blade 146; a scraper blade activator 147; and, a turntable stepper motor 148. The storage unit 38 occupies a compartment 149 provided in the satellite housing 43. A pair of bay doors 150 mounted on the satellite housing 43 are selectively activatable to permit the compartment 149 to selectively communicate with outer space.

The residual debris storage tank 140 is in the form of an essentially hollow cylinder having a major cylindrical axis which is substantially colinear with the major cylindrical axis 44 of the satellite housing 43. The storage tank 140 has a first end wall 152 and a second end wall 154. The storage tank first end wall is oriented toward the separator unit 36; the storage tank second end wall contacts the tank turntable 144. The storage tank 140 has an essentially cylindrical inlet neck 156 formed on its first end wall 152 proximate its periphery. The inlet neck 156 is formed so that the neck 156 can be selectively aligned and sealed with each separator chamber 108 as the storage tank 140 is revolved on the tank turntable 144.

Figure 8:
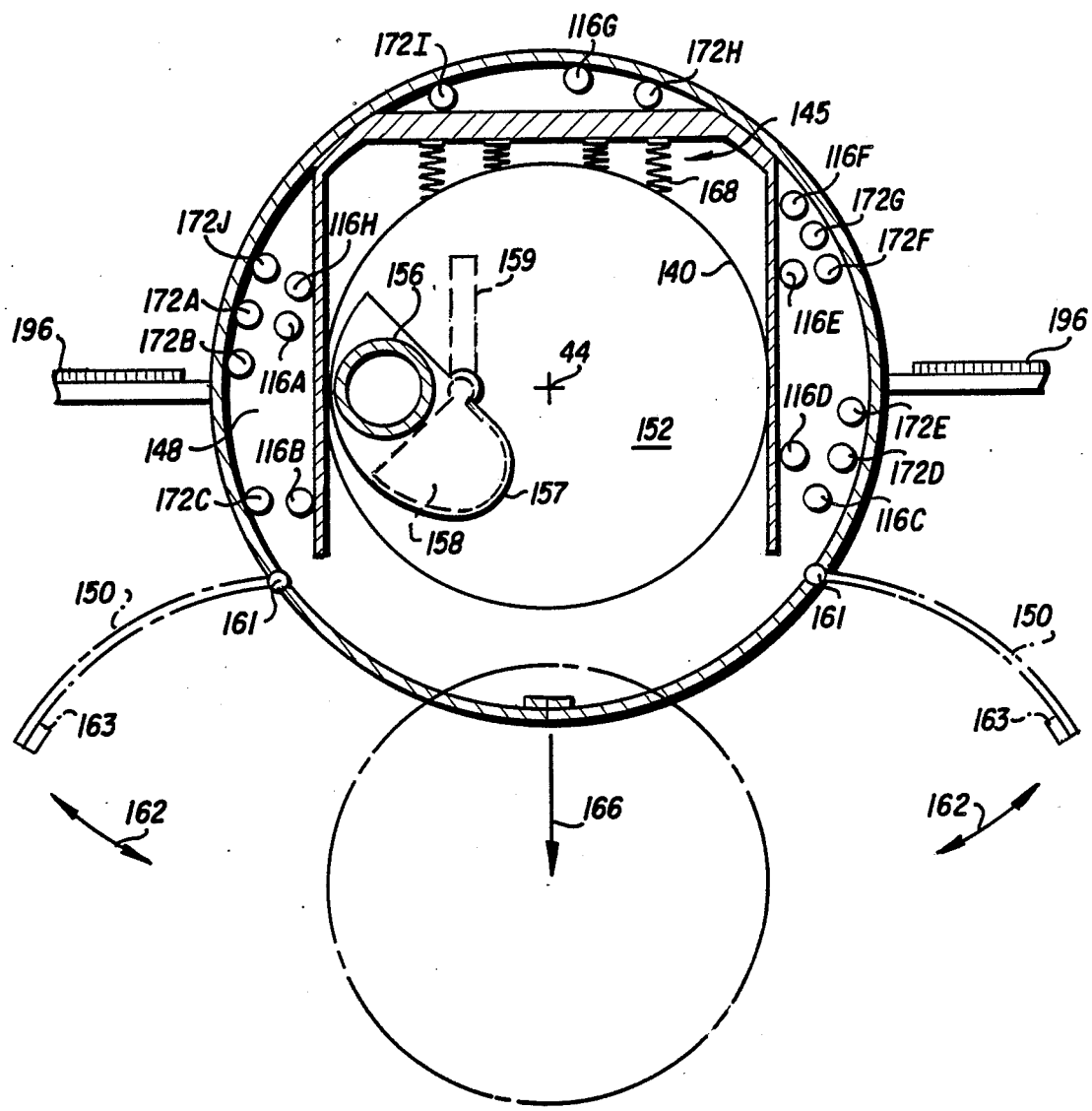
FIG. 8 is a sectional view of the orbital debris mitigation system of the embodiment of FIG. 1 taken along the line 8—8 of FIG. 2.

The storage tank inlet neck 156 has an enclosed slot 157 formed in its cylindrical side wall which accommodates a closure lid 158. As shown in FIG. 8, when the storage tank 140 is to remain open, the closure lid 158 occupies a position which is essentially tangential to the inlet neck 156. When the storage tank 140 is to be closed, the tank closure activator 142 rotates the closure lid 158 so that the closure lid 158 completely blocks the inlet neck 156 to effectively seal the storage tank 140. The tank closure activator 142 is mounted to the exterior of the enclosed storage tank inlet neck slot 157, between the slot 157 and the first end wall 152 of the storage tank 140, and is connected to the closure lid 158 by a shaft.

The piston scraper blade 146 is mounted on the first end wall 152 of the residual debris storage tank 140 to scrape any residual debris from the end of each separator chamber piston 120 when each piston 120 is extended through the storage tank inlet neck 156 and into the interior of the storage tank 140. The scraper blade 146 is mounted proximate the periphery of the tank inlet neck 156, on a shaft that is rotatably driven by scraper blade activator 147. The axis of scraper blade rotation is parallel to the major cylindrical axis of the tank inlet neck 156. The scraper blade activator 147 is mounted to the exterior of tank wall 152, between tank wall 152 and tank closure activator 142. When a piston 120 is extended through storage tank inlet neck 156 and into the interior of storage tank 140, scraper blade 146 is rotated by blade activator 147 in such a way as to scrape across the flat surface of piston 120 and dislodge any residual debris that may be attached thereto.

Bay door activators 161 are mounted on the satellite housing 43 in compartment 149 and actuate the opening and closing of the bay doors 150. The bay doors 150 open and close by moving in the direction of arrows 162 as shown in FIG. 8. When the bay doors 150 are closed, they are held closed by bay door latches 163, which are mounted on the interior side of each by door 150 and at the edge of each bay door 150 which contacts the edge of the other bay door 150 when they are in the closed position.

The tank turntable 144 is essentially disc shaped and is revolved by the turntable stepper motor 148 and connecting shaft 165. The surface of the turntable 144 which contacts the storage tank 140 is keyed with the bottom of the storage tank 140 so that the storage tank 140 can engage the turntable 144 and yet be radially displaced therefrom when the storage tank 140 is ejected (in the direction of arrow 166) from the satellite housing 43 through the bay doors 150.

The tank ejector system 145 is comprised of means, such as electrically-activated ejector springs 168, for imparting momentum to the storage tank 140 when the bay doors 150 are opened. The ejector means are capable of imparting sufficient momentum, when the satellite housing 43 is properly oriented, to effectively launch the storage tank 140 along a trajectory that causes the storage tank 140 to re-enter the Earth's atmosphere and to be disintegrated during the re-entry.

The fluid reservoir unit 40 includes a reservoir tank 169 that is in the form of an essentially hollow cylinder having a major cylindrical axis which is substantially colinear with the major cylindrical axis 44 of the satellite housing 43. On the first end thereof, the reservoir tank 169 is connected to each of the eight separator outlet pipes 116 (see FIG. 2). Each separator outlet pipe 116 has a reservoir tank inlet valve 170 associated therewith proximate the point at which the pipe 116 is sealed to the exterior of the first end of the reservoir tank 169. Also on the first end thereof, the reservoir tank 169 is connected to each of ten nozzle supply pipes 172.

Each nozzle supply pipe 172 has a reservoir tank outlet valve 171 associated therewith proximate the point at which the pipe 172 is sealed to the exterior of the first end of the reservoir tank 169. Each of the nozzle supply pipes 172 has a main nozzle supply pump 174 provided thereon, and mounted near the left end of the satellite housing 43 (see FIG. 2), for pumping liquid from the reservoir tank 169 in the direction of arrows 176. The nozzle supply pipes 172 extend through an end wall of the satellite housing 43 which is nearest the cone 30 for ultimate connection to the circular manifold 54 which extends around the periphery of the cone open mouth 50.

Each nozzle supply pipe 172 has a manifold inlet valve 178 associated therewith proximate the point at which the pipe 172 is sealed to the exterior of the circular manifold 54. Between each main pump 174 and the point at which each nozzle supply pipe 172 is sealed to the exterior of the circular manifold 54, each pipe 172 passes through the interior of an associated, essentially tubular, structural support member 175 such that the major cylindrical axis of each pipe 172 is essentially colinear with the major cylindrical axis of its associated support member 175. The support members 175 provide rigidity and support for the cone 30 and the nozzle supply pipes 172, and provide thermal and structural shielding for the supply pipes 172. The reservoir tank 169 and its associated system of pipes, valves, and pumps include appropriate interfaces, connectors, and other means on the exterior and interior of the satellite housing 43, by which the reservoir tank 169 can be refilled on-orbit with liquid from an exterior supply or servicing spacecraft.

Figure 9:
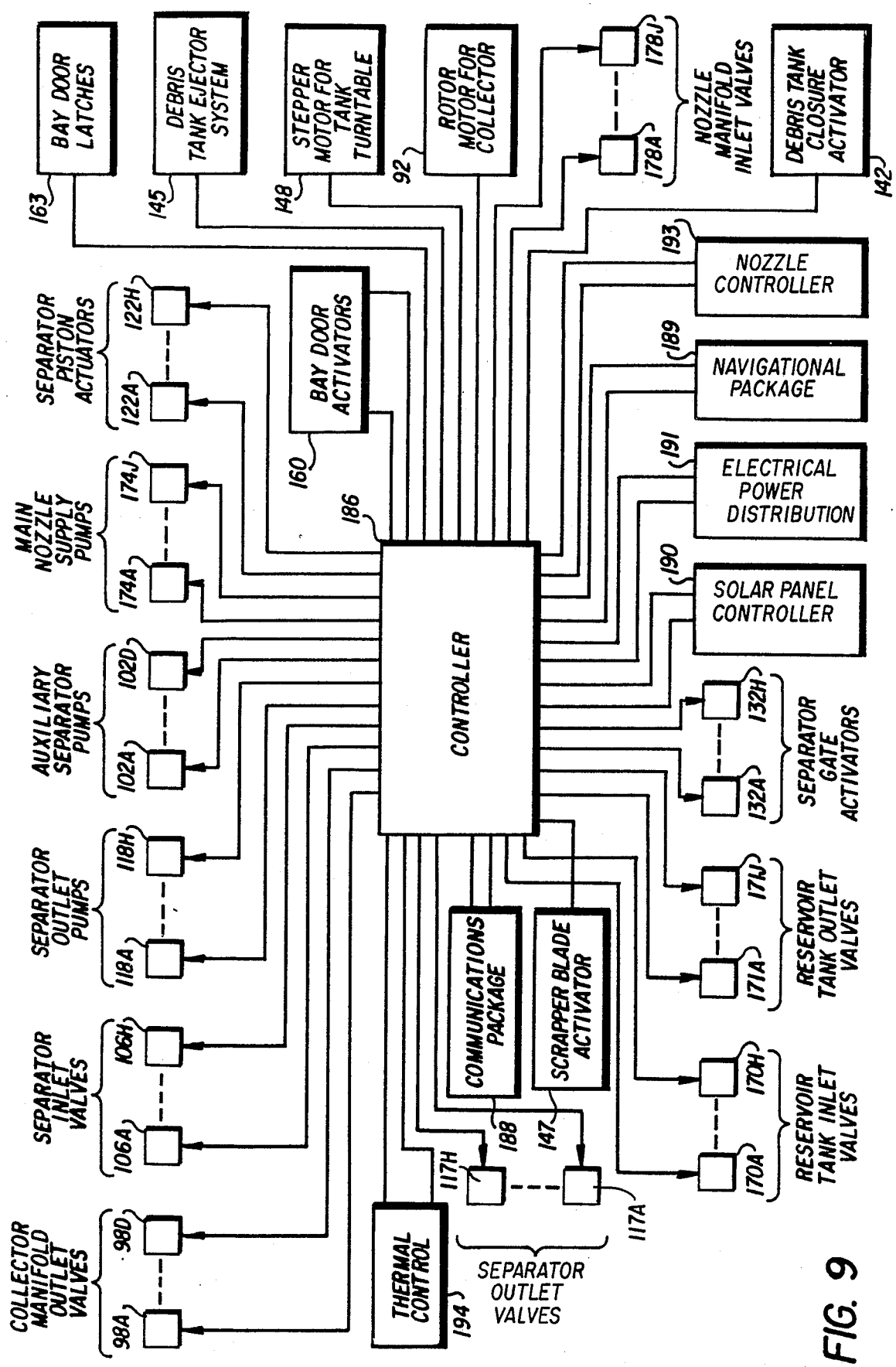
FIG. 9 is a schematic view of a satellite control unit included in the orbital debris mitigation system of the embodiment of FIG. 1.

The satellite control unit 42 occupies a compartment 184 formed at the end of the satellite housing 43 which is furthermost from the cone 30. As shown in FIG. 9, the satellite control unit 42 includes a controller 186. The controller 186 includes a central processing unit, appropriate memory banks for storing information, and input/output ports. Appropriate input/output ports of the controller 186 are connected by appropriate busses and cables to a satellite communications package 188; a satellite navigational package 189; a solar panel controller 190; an electrical power distributor package 191; a nozzle controller 193; and, a thermal control system 194. The nozzle controller 193 is further connected to each of the nozzles 56 for governing the emission of droplets therefrom.

Other input/output ports of the controller 186 are operatively connected to control various elements such as those hereinbefore described, including the collector manifold outlet valve 98A-98D; separator inlet valves 106A-106H; the separator outlet pumps 118A-118H; the auxiliary separator pumps 102A-102D; the main nozzle supply pumps 174A-174J; the separator piston activators 122A-122H; the separator gate activators 132A-132H; the bay door activators 160; the bay door latches 163; the debris ejector system 145; the stepper motor 148 for the tank turntable 144; the motor 92 for the collector unit 34; the debris tank closure activator 142; the separator outlet valves 117A-117H; the scraper blade activator 147; the reservoir tank inlet valves 170A-170H; the reservoir tank outlet valves 171A-171J; and, the nozzle manifold inlet valves 178A-178J.

The satellite is equipped with appropriate communications, navigation and propulsion, electrical power generation and distribution, and thermal control systems. A system of electrical heaters will be utilized as necessary to maintain the appropriate liquid temperatures. The preferred electrical generation system is a solar array 196, with appropriate secondary batteries for energy storage. The solar array 196 is extendible and retractable such that it can be fully extended for optimum power generation during periods of normal operation, and partially or fully retracted for maximum protection during periods when severe or numerous collisions with orbital debris are expected. The satellite and its subsystems allows and facilitates on-orbit servicing (such as maintenance, repair, resupply, etc.) to the fullest extent considered cost-effective and desirable for overall mission performance.

Figure 11:
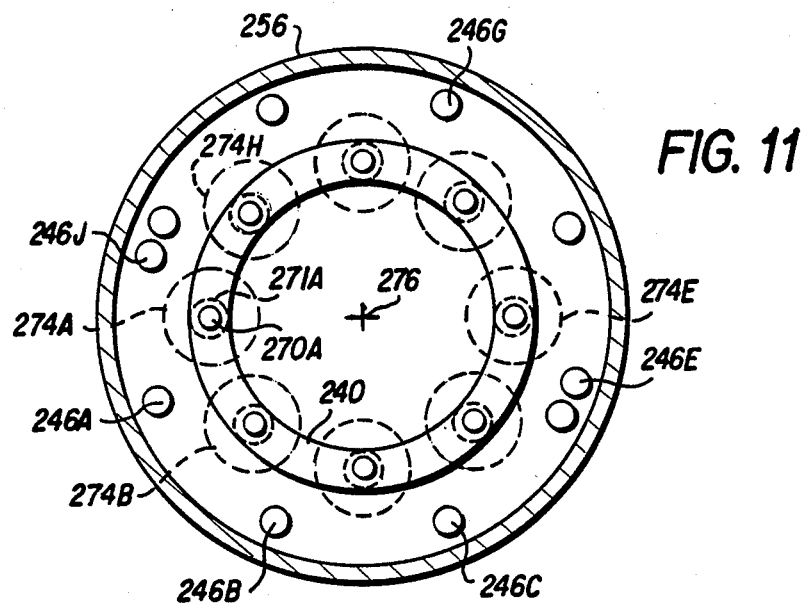
FIG. 11 is a sectional view of the orbital debris mitigation system of the embodiment of FIG. 10 taken along the line 11—11 of FIG. 10.
Figure 12:
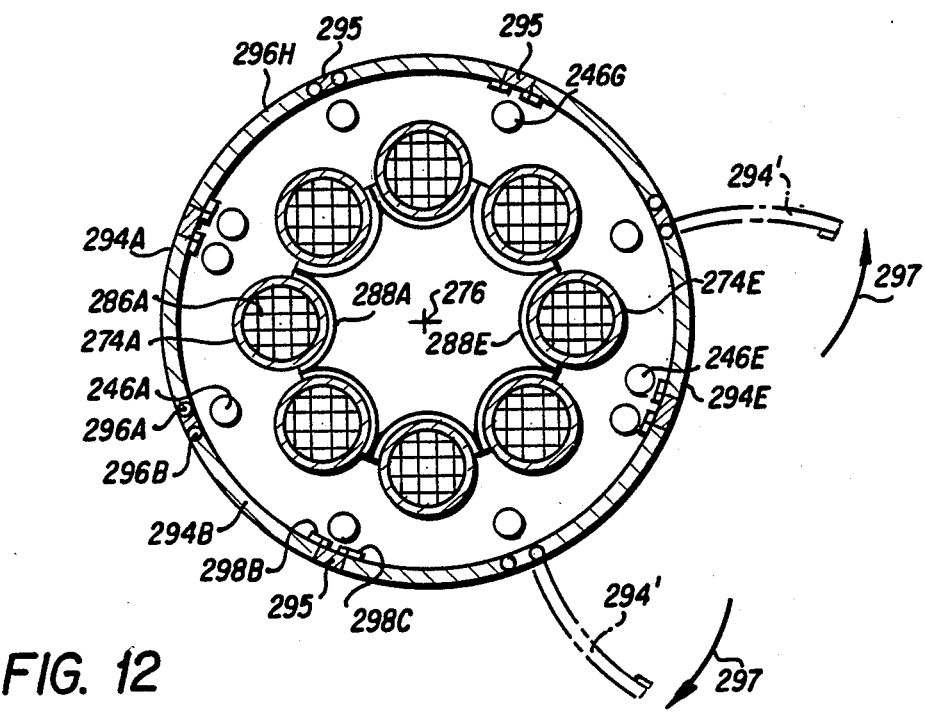
FIG. 12 is a sectional view of the orbital debris mitigation system of the embodiment of FIG. 10 taken along the line 12—12 of FIG. 10.
Figure 14:
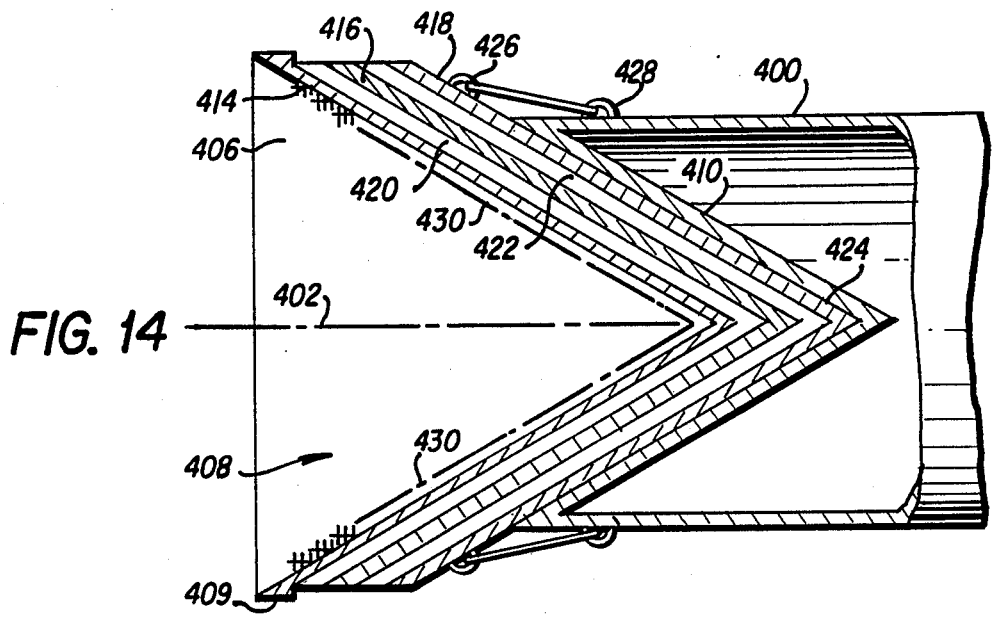
FIG. 14 is a cross-sectional view of the orbital debris mitigation system of the embodiment of FIG. 13 showing a mitigation cone engaged with a satellite superstructure.
Figure 15:
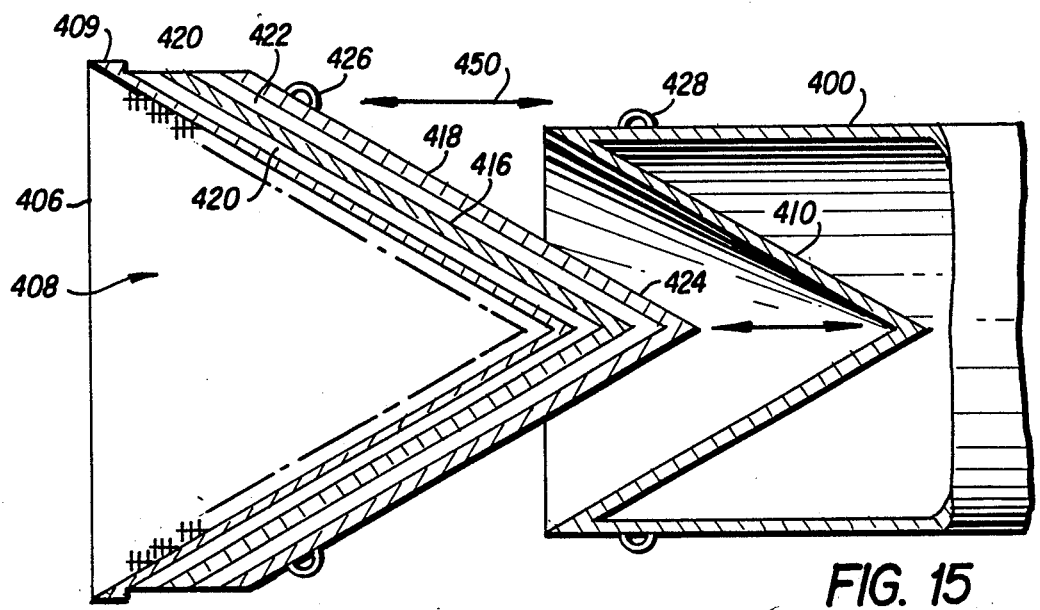
FIG. 15 is a cross-sectional view of the orbital debris mitigation system of the embodiment of FIG. 13 showing a mitigation cone being disengaged from a satellite superstructure.

The orbital debris mitigation system of the embodiment of FIGS. 10-12 resembles to some degree the system of the embodiment of FIG. 2. In this regard, the system of the embodiment of FIG. 10 has a cone 230 (like cone 30 of the embodiment of FIG. 2) for defining an intake region 232 (like region 32); a collector unit 234 (like unit 34); collector outlet pipes 236 (like pipes 96); pumps 238 (like pumps 102); a manifold ring 240 (like ring 100); a reservoir 242 (like reservoir 169); nozzle supply pumps 244 (like pumps 174); and, nozzle supply lines 246 (like lines 172). As described hereinafter, the orbital debris mitigation system of the embodiment of FIG. 10 basically differs from the embodiment of FIG. 2 in the structure and configuration of the separator units and, to some extent, the satellite housing.

The pumps 238 and manifold ring 240 of the separator unit of the orbital debris mitigation system of the embodiment of FIG. 10 are located in a compartment 254 defined by the satellite housing 256. The satellite housing 256 also defines other compartments, such as canister compartment 258; a liquid reservoir compartment 260; and, a satellite control unit compartment 262.

The manifold ring 240 communicates with eight distribution pipes 270A-270H. Each distribution pipe 270 extends through a corresponding opening in a wall of the satellite housing which separates compartments 254 and 258 and has a separator inlet valve 271 provided thereon for controlling the communication into an associated separator canister 274.

Eight removable separator canisters 274A-274H are mounted in the canister compartment 258, with the canisters 274 being arranged (as shown in FIGS. 11 and 12) in a circular pattern about the major cylindrical axis 276 of the satellite housing 256. Each canister 274 is essentially cylindrical, having a first end wall 278 and a second end wall 280. The first end wall 278 of each canister 274 has an inlet orifice 282 which is alignable for sealing engagement with a corresponding distribution pipe 270 via a corresponding separator inlet valve 271. The second end wall 280 of each canister 274 has an outlet orifice 283 which is alignable for sealing engagement with a corresponding separator outlet pipe 284 via a corresponding separator outlet valve 285. The separator outlet valves 285 control the communication out of an associated separator canister 274 and into a corresponding outlet pipe 284. Proximate the second end wall 280 of each canister 274 is a filter medium 286. Each canister 274 is selectively held in position in canister compartment 258 by an associated canister retainer 288 so that the inlet orifice 282 is sealingly aligned with a distribution pipe 270 via a corresponding inlet valve 271 and so that the filtered outlet orifice 283 is sealingly aligned with a corresponding outlet pipe 284 via a corresponding outlet valve 285.

The separator outlet valves 285 are mounted on a wall of the satellite housing which separates compartments 258 and 260. The inlet valves 271 and outlet valves 285 are constructed to allow each separator canister 274 to be easily disconnected from the pipes 270 and 284, permitting the removal of each canister 274 from the canister compartment 258. The valves 271 and 285 allow the canister orifices 282 and 283 and the pipes 270 and 284 to all be independently closed and sealed when the canisters 274 are to be disconnected and removed.

Each separator outlet pipe 284 extends through a corresponding opening in a wall of the satellite housing which separates the canister compartment 258 from the reservoir compartment 260 and has a separator outlet pump 289 provided thereon in compartment 260, downstream from the separator outlet valve 285, to operate on the liquid conveyed therethrough.

Each outlet pipe 284 has a reservoir inlet valve 290 associated therewith downstream from the outlet pump 289 and proximate the point at which the pipe 284 is sealed to the exterior of the first end of the reservoir tank 242. Also on the first end thereof, the reservoir tank 242 is connected to each of the ten nozzle supply pipes 246. Each nozzle supply pipe 246 has a reservoir tank outlet valve 292 associated therewith proximate the point at which the pipe 246 is sealed to the exterior of the first end of the reservoir tank 242. Each nozzle supply pipe 246 has a main nozzle supply pump 244 provided thereon, and mounted near the left end of the satellite housing 256 (see FIG. 10), for pumping liquid from the reservoir tank 242 in the direction of arrows 293 to the nozzles around the periphery of the open mouth of the cone 230.

The satellite housing 256 of the orbital debris mitigation system of the embodiment of FIG. 10 has a plurality of doors 294 formed therein in the vicinity of the canister compartment 258 in order to permit access to the removable separator canisters 274. The doors 294 are provided between housing segments 295 as shown in FIG. 12. Canister compartment door activators 296 are mounted on the housing segments 295 in compartment 258 and actuate the opening and closing of the doors 294. Passive hinges could also be used instead of activators 296, if it better satisfies satellite servicing options. The doors 294 open and close by moving in the direction of arrows 297 as shown in FIG. 12. When the doors 294 are closed, they are held closed by door latches 298, which are mounted on the interior side of the abutting edges of each door 294 and the abutting housing segment 295. The position of doors, when opened, is shown by phantom lines 294' in FIG. 12.

Structure: Filament Embodiments

Figure 13:
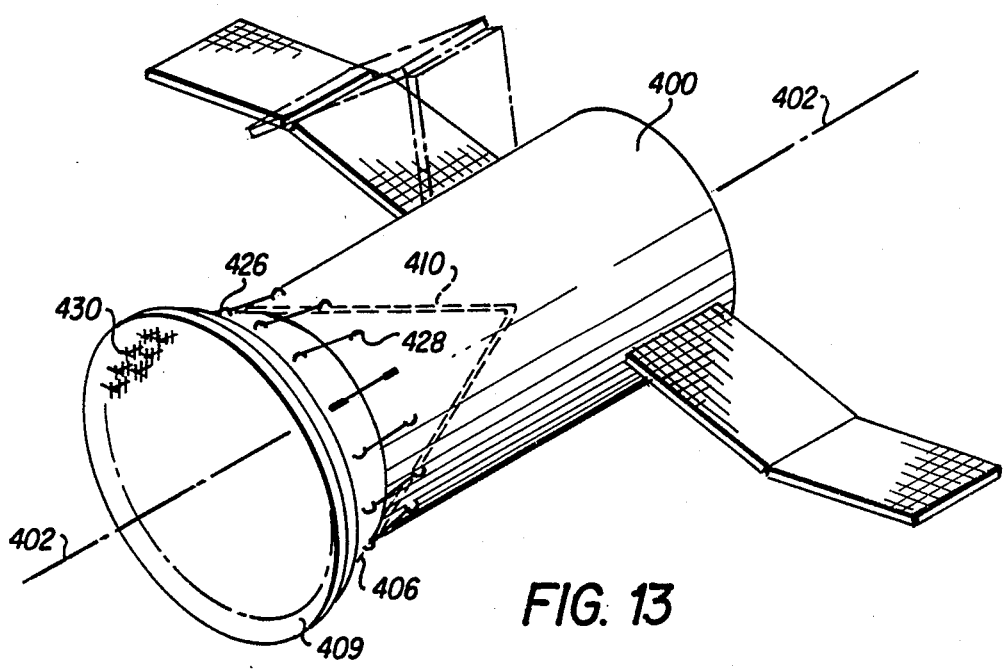
FIG. 13 is a perspective view of an orbital debris mitigation system according to another embodiment of the invention.

The orbital debris mitigation system of the embodiment of FIG. 13 comprises an essentially cylindrical satellite housing 400, also known as a superstructure. The satellite superstucture 400 has a major cylindrical axis 402. The system further includes a debris mitigation cone 406 which defines a bounded intake or collision region 408.

To protect the outer edge of the debris mitigation cone 406 from direct and unobstructed collisions with orbital debris, a circular impact shielding ring 409, which is similar to the shielding ring 57 of the embodiment of FIG. 2, is attached to cone 406 along the circumference of its open mouth.

An end wall 410 of the satellite superstructure 400 is formed to accommodate the debris mitigation cone 406. The remainder of the satellite housing 400 contains other components, such as a satellite control unit (unillustrated) including various communication and navigational packages.

The mitigation cone 406 comprises a substrate 414 and two bumper sheets 416 and 418. A greater number of bumper sheets can be used if necessary. The substrate 414, bumper 416, and bumper 418 resemble three stacked conical members, with each conical member being separated from the others by a gap. In particular, a gap 420 spaces apart the substrate 414 and the bumper 416, while a gap 422 spaces apart the bumper sheet 416 and the bumper sheet 418. An outer surface 424 of the bumper 418 is received by the correspondingly-shaped superstructure end wall 410. The outer surface 424 of the bumper 418 has a plurality of locking members 426 provided thereon which are adapted to mate with or to otherwise be engaged with corresponding locking members 428 provided on the superstructure 400.

Figure 18:
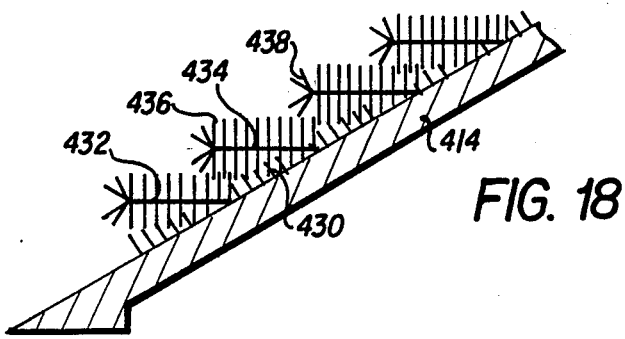
FIG. 18 is a cross-sectional detailed view showing filaments on a substrate according to the orbital debris mitigation system of the embodiment of FIG. 13; and, FIG. 19 is a cross-sectional detailed view showing a portion of an arrangement of a plurality of debris mitigation cones connected to form a debris shield mounted on the exterior surface of a space structure or facility.

The substrate 414 of the embodiment of FIG. 13 has a collision medium provided on the interior surface thereof. In particular, for the embodiment of FIG. 13 the collision medium comprises a plurality of filaments. Certain ones of the filaments, such as filaments 430 shown in FIG. 18, are single member filaments which extend essentially orthogonally from the inner surface of the substrate 414. Other filaments compose a brush-like structure illustrated as elements 432 in FIG. 18. Each brush-like structure 432 includes a trunk filament 434 which extends from the inner surface of the substrate 414 in a direction which is essentially parallel to the major cylindrical axis 402 the housing 400 (which, in the illustrated embodiments, is also colinear with the major axis of debris mitigation cone 406). Each trunk filament 434 has a plurality of branch filaments 436 spaced therealong, the branch filaments 436 extending essentially orthogonally from their trunk filament 434. One or more of the branch filaments furthermost from the substrate 414 on each trunk filament 434 are inclined at an acute angle with respect to the trunk filament 434 (such as filament 438 shown in FIG. 18). Filament material, size, and arrangement is selected to optimize the efficient destruction of debris particles within the size range accommodated by a mitigation system.

Mitigation cones such as the cone 406 shown in FIG. 13 are connectable or linkable together in a variety of configurations. One such configuration is illustrated in FIGS. 16 and 17, wherein four such cones 440A, 440B, 440C, and 440D are shown connected together by nodal connector 442. The nodal connector 442 is mounted on a satellite 444. Other configurations include linearly-extending arms or beams that have the apices of a plurality of mitigation cones attached thereto.

Mitigation cones are also connectable or linkable together in a variety of configurations to comprise the outer shielding skin of a space facility or structure. FIG. 19 shows the cross section of a portion of one such configuration, wherein multi-sided conic sections are connected to cover an extended external area of a space structure or facility. The mitigation cones 500 each comprise a cone substrate 502 and a collision medium provided on the interior surface thereof. For the embodiment of FIG. 19, the collision medium comprises a plurality of filament elements 504 which are similar to the brush-like filament elements 432 of the embodiment of FIGS. 13 and 18. Each brush-like element 504 includes a trunk filament 506 which extends essentially orthogonally from the inner surface of the cone substrate 502. Each trunk filament has a plurality of branch filaments 508 spaced therealong, the branch filaments 508 extending essentially orthogonally from their trunk filament 506.

The mitigation cones 500 are multi-sided conic sections which are connected to their adjacent cones 500 along the contacting edges which form the periphery of their open mouths. The number of sides associated with each cone 500, and the arrangement of the cones 500 when they are connected, determines the shape of the shield surface. In particular, six-sided conic sections can be connected to form a flat surface, resembling a honeycomb, and a combination of five-sided conic sections and six-sided conic sections can be connected to form a curved or spherical surface.

The apices of the cones 500 are connected to the outer hull 510 of the space structure or facility being shielded. Beneath the outer hull 510, are two bumper sheets 512 and 514 which are separated from each other and from the hull 510 by the gaps 516 and 518. In particular, a gap 516 spaces apart the hull 510 and the bumper 512, while a gap 518 spaces apart the bumper 512 and the bumper 514. In addition, a bumper sheet 520 is located between adjacent cones 500 and extends orthogonally from the exterior surface of the hull 510 to the adjoining edges of the open mouths of the cones 500.

Operation: Fluid Embodiments

In the operation of the orbital debris mitigation system of the embodiment of FIG. 2, the controller 186 opens the reservoir outlet valves 171 and enables the nozzle supply pumps 174 to supply liquid from the reservoir tank 169 to the manifold 54 and nozzles 56 in the cone 30. The controller further activates the nozzle controller 193 so that droplets of appropriate size are pulsed from the nozzles 56 to form the plurality of streams that are directed from the nozzles 56 to the focal point 66 of the collector unit 34. The controller 186 further energizes the collector motor 92; selected collector manifold outlet valves 98; the corresponding auxiliary separator pumps 102; and, a select corresponding set of separator inlet valve 106, separator outlet valve 117, outlet pump 118, and reservoir inlet valve 170. Thus, the selected inlet valve 106, outlet valve 117, and inlet valve 170 are all open. Any number of corresponding sets of the separator inlet valve 106, outlet valve 117, outlet pump 118, and reservoir inlet valve 170 can be open at any time, depending on system operational status and needs. Moreover, if necessary the controller 186 applies pulses to the stepper motor 148 so that the tank turntable 144 is revolved to a position at which the tank inlet neck 156 is aligned under the particular separator chamber 108 whose inlet valve 106 has been opened. The controller 186 applies a signal to the tank closure activator 142 so that closure lid 158 at least initially covers the inlet neck 156. The controller 186 further closes each of the gates 130.

A particle of orbital debris 600, most probably in a size range of approximately one centimeter in diameter and less, enters the intake region 32 defined by the cone 30 and eventually collides, at hyper-velocity speeds, with a droplet comprising one of the fluid streams generated from the nozzles 56. Upon collision, a particle of debris is substantially vaporized as shown at 602 in FIG. 1. As mentioned before, as used herein the term "substantially vaporized" means that some such particles may be completely vaporized. Any debris remaining after the collision, referred to herein as residual debris, is entrained in a droplet stream and directed by the droplet stream into the collector bucket 82. It will be appreciated that at any given point in time a slurry, comprising liquid and possibly residual debris, will be entering the collector bucket 82.

The collector bucket 82 (containing vanes 86 with fins 88) of the collector unit 34 is rotatably driven by the motor 92. The centrifugal force occasioned by the rotation of the bucket 82 and fins 88 causes the slurry to be directed radially outwardly through the collector bucket ports 94 and into the pipes 96. The slurry is assisted through the pipes 96 and into the ring manifold 100 by the propulsion provided by the auxiliary pumps 102. The slurry which enters the ring manifold 100 is precluded from entering the separator chambers 108 except the particular separator chamber 108 for which an associated inlet valve 106 has been opened by the controller 186.

The slurry entering a separator chamber 108 through its associated inlet valve 106 is at least temporarily retained in the separator chamber 108 inasmuch as the gate 130 is initially maintained in its closed position by gate activator 132. Liquid in the slurry passes through the filter medium 114; through the separator outlet valve 117; through the separator outlet pump 118; through the pipe 116; through the reservoir tank inlet valve 170; and, into the reservoir 169. Residual debris in the slurry is temporarily retained in the separator chamber 108 since the residual debris is incapable of passing through the filter medium 114 and since the gate 130 is closed.

When the controller 186 determines that the separator chamber 108 contains sufficient residual debris, the controller 186 issues a series of signals to commence emptying the separator chamber 108. The controller 186 first ensures that the gate 130 associated as chamber 108B) is in its closed position. The controller 186 then applies signals to open a separator inlet valve 106, a separator outlet valve 117 and a reservoir inlet valve 170 (such as valves 106B, 117B and 170B) associated with the second separator chamber 108B; to activate an outlet pump 118 (such as pump 118B) associated with a second separator chamber 108B; and to close the separator inlet valve 106 (such as valve 106A) associated with the first (full) separator chamber (such as chamber 108A). At point, the slurry from the separator manifold ring 100 no longer enters the first (full) separator chamber 108A, but is directed instead into the second separator chamber 108B. The second separator chamber 108B thus begins to fill with slurry and debris as the steps described in the following two paragraphs are executed.

The controller 186 signals the debris tank closure activator 142 to remove the closure lid 158 from the inlet neck 156 of the debris storage tank. The controller 186 then applies a signal to the separator piston activator 122A associated with the full separator chamber 108A so that piston 120A moves rightwardly as shown in FIG. 2 to compress the debris in the separator chamber 108A. As the debris in the separator chamber 108A is being compressed by the movement of piston 120A, any liquid in the separator chamber 108A is forced through the filter medium 114A and outlet valve 117A and is pumped into the reservoir 169 through reservoir inlet valve 170A. The controller 186 then applies a signal to close outlet valve 117A, stop pump 118A and close inlet valve 170A to assure that liquid does not flow back into the separator chamber 108A. With the piston 120A still being urged rightwardly to compress the debris, the controller 186 applies a signal to the gate activator 132A associated with the full separator chamber 108A, whereby the gate 130A is retracted from covering the inlet neck 156.

With gate 130A withdrawn, with closure lid 158 retracted, and with the piston 120A urged rightwardly (to its fully extended position), the residual debris in the full separator chamber 108A is pushed out of the separator chamber 108A, through the inlet neck 156, and into the debris storage tank 140. The controller 186 then signals the scraper blade activator 147 to rotate the piston scraper blade 146 for one revolution across the right end of the piston 120A, thusly dislodging any residual debris that may be attached thereto. After the debris has thusly been ejected from the separator chamber 108A, the controller 186 issues a signal to the piston activator 122A to withdraw the piston 120A to its original position, and to the gate activator 132A to again close the gate 130A associated with the separator chamber 108A. Likewise, the controller 186 issues a signal to the debris tank closure activator 142 to position the closure lid 158 in the inlet neck 156 of the debris storage tank 140. The controller 186 then directs the stepper motor 148 for the tank turntable 144 to revolve the turntable 144 so that the inlet neck 156 is next aligned under the second separator chamber 108B. When the second separator chamber 108B becomes filled, the slurry is directed to a third separator chamber and the second separator chamber 108B is emptied in analogous manner as described above with reference to separator chamber 108A.

From the foregoing it should be understood that separator chambers 108 can be emptied in any convenient pattern, and that the slurry can simultaneously be directed to a plurality of separator chambers 108. In such instance, the controller 186 is programmed to issue appropriate signals to the various activators discussed above. Moveover, controller 186 can determine when particular separator chambers 108 are to be emptied by a suitable means, as by ajudging a suitable lapse of time or by monitoring sensors indicative of the expected filling of the separator chambers 108.

Liquid which passes through the filter medium 114 and outlet valve 117 of a separator chamber 108 is pumped by outlet pump 118 through pipe 116 and inlet valve 170 and into the reservoir 169 for storage and eventual reuse as collision liquid. In this regard, the nozzle supply pumps 174 pump liquid from the reservoir 169 through the reservoir outlet valves 171; through the nozzle supply pipes 172; through the cone manifold 54; and to the nozzles 56. The nozzles 56 issue streams of droplets in the manner described hereinbefore, with the streams of droplets serving as the medium for yet further collisions.

When the debris storage tank 140 becomes full, or at whatever other time the controller 186 may determine, the storage tank 140 can be ejected from the satellite housing 43. Ejection of the storage tank 140 preferably occurs when the satellite is so oriented that the ejected tank 140 will be directed to re-enter the Earth's atmosphere, and thus disintegrate.

In supervising the ejection of the storage tank 140, the controller 186 first issues a signal to the debris tank closure activator 142 to ensure that the closure lid 158 covers the inlet neck 156 of the storage tank 140. The controller 186 then directs the bay door latches 163 to open and the bay door activators 161 to open the bay doors 150 so that the doors 150 are substantially in the position shown in FIG. 8. When the satellite is in the desired navigational orientation, the controller 186 issues a command to the debris ejector system 145. The ejector 168 of the ejector system 145 launches the storage tank 140 in the direction of arrow 166.

To a considerable extent, the operation of the orbital debris mitigation system of the embodiment of FIG. 10 resembles the operation of the embodiment of FIGS. 1 and 2. In this regard, the cone 230, the collector unit 234, collector outlet pipes 236, pumps 238, manifold ring 240, reservoir 242, nozzle supply pumps 244, and nozzle supply lines 246 all function in like manner as described above with reference to similarly denominated elements of the orbital debris mitigation system of the embodiment of FIGS. 1 and 2.

The operation of the orbital debris mitigation system of the embodiment of FIG. 10 basically differs from the system of FIGS. 1 and 2 in the filling and removal of the separator canisters 274. In this regard, the controller of the embodiment of FIG. 10 opens and closes select ones of the separator inlet valves 271 and outlet valves 285, and reservoir inlet valves 290 to direct the slurry into desired ones of the separator canisters 274. Liquid from the slurry passes through the filter medium 286. When it is desired to remove a separator canister 274 that is full of debris, the controller signals the inlet valve 271 and the outlet valve 285 to close, thusly sealing independently each of the canister orifices 282 and 283 and pipes 270 and 284. The controller, an astronaut, or an external satellite servicing spacecraft then opens the door latches 298 and signals the door activator 296 to open an appropriate door 294. The canister 274 then can be disengaged from its attachments to the pipes 270 and 284 and its retainer means 288 and radially withdrawn through an appropriate door 294 provided in the satellite housing (see FIG. 12).

Operation: Filament Embodiments

In the operation of the orbital debris mitigation systems of the embodiments of FIGS. 13–18, a particle of debris travelling at hyper-velocity speeds enters the collision region 408 defined by the intake cone 406 and collides with one or more filaments mounted on the interior surface of the substrate 414. Most likely the debris particle will collide with a distal or end filament provided on one of the brush-like structures 432, such as inclined filament 438. Upon collision, the debris particle and a contacted portion of the filament will be substantially vaporized. Any residual debris remaining after the collision will likely be trapped between other filaments, or between a filament and the substrate 414. For example, residual debris can be trapped between filaments 430 and trunk filaments 434.

Upon some collisions it is possible that a portion of the substrate 414 might be vaporized or penetrated. In such case, the gap 420 between the substrate 414 and the bumper sheet 416 serves to trap any residual debris. Likewise, should a portion of the bumper 416 be involved in a collision that results in vaporization or penetration of that portion of bumper 416, the gap 422 serves to trap residual debris.

When a cone 406 thus gathers a considerable amount of residual debris or is considerably degraded by numerous debris collisions, the cone 406 can be selectively replaced by disengaging the locking members 426, 428; by separating the cone 406 from the superstructure 400 (in the direction of arrow 450 shown in FIG. 15); by inserting another cone 406 into the superstructure 400; and, by engaging the locking members 426 and 428.

The operation of the orbital debris mitigation system of the embodiment of FIG. 19 is essentially the same as the embodiments of FIGS. 13–18.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method for mitigating orbital debris, said method comprising the steps of:
carrying, on a space structure, means for defining a bounded debris intake region, said debris intake region having a mouth to permit the entry of orbital debris therein;
providing a collision medium in said debris intake region, said collision medium including a stream of fluid droplets;
directing said collision medium toward a collector in a manner to promote hyper-velocity collisions with orbital debris and to transport any debris remaining after said collision to said collector; and,
using said collector to trap any debris remaining after said collision.

2. The method of claim 1, wherein said collection medium is directed toward said collector as a droplet stream with the direction of said stream having a conically-spiralling component.

3. The method of claim 1, wherein said collision medium is directed toward said collector as a droplet stream with the direction of said stream having a diagonal component corresponding to the intersection of a partial plane and a conical surface of rotation.

4. The method of claim 1, wherein said collision medium is directed toward said collector as droplet streams with droplets, at least some of said streams having a conically-spiralling component and at least some of said streams having a diagonal component corresponding to the intersection of a partial plane and a conical surface of rotation.

5. The method of claim 1, wherein said debris remaining after said collision is trapped in a manner whereby said remaining debris is retrievable.

6. The method of claim 1, further comprising the step of:
separating any debris remaining after said collision from said collision medium.

7. The method of claim 6, further comprising the step of:
storing any debris remaining after said collision in a storage means, said storing step occuring after said remaining debris is separated from said collision medium.

8. The method of claim 7, wherein said storing step involves the directing of said remaining debris to a selected one of a plurality of storage receptacles.

9. The method of claim 6, further comprising the step of:
re-directing said collision medium, after any remaining debris is separated therefrom, in a manner whereby said collsion medium is reusable to promote hyper-velocity collsions with yet further orbital debris.

10. A method for mitigating orbital debris, said method comprising the steps of:
carrying, on a space structure, means for defining a bounded debris intake region, said debris intake region having a mouth to permit the entry of orbital debris therein;
providing a collision medium in said debris intake region, said collision medium comprising a plurality of filaments mounted on a substrate and oriented to facilitate hyper-velocity collisions;
using other filaments proximate filaments with which said orbital debris collides to trap any debris remaining after said collision.

11. The method of claim 10, further comprising the step of:
selectively removing said collision medium and said remaining debris trapped therein from a superstructure adapted to accommodate said substrate.

12. The method of claim 11, further comprising the step of:
replacing said collision medium and said remaining debris trapped therein with a further substrate having collision medium provided thereon.

13. Apparatus for mitigating orbital debris, said apparatus comprising:
means mountable on a space structure for defining a bounded debris intake region, said debris intake region having a mouth to permit the entry of orbital debris therein;
a collision medium provided in said debris intake region, said collision medium including a stream of fluid droplets; and,
means mountable on said space structure for trapping any debris remaining after a hyper-velocity collision of orbital debris with said collision medium, said trapping means including a collector and means for directing said collision medium toward said collector in a manner whereby said collision medium transports any debris remaining after said collision to said collector.

14. The apparatus of claim 13, wherein said collision medium is directed toward said collector as a droplet stream with the direction of said stream having a conically-spiralling component.

15. The apparatus of claim 13, wherein said collision medium is directed toward said collector as a droplet stream with the direction of said stream having a diagonal component corresponding to the intersection of a partial plane and a cone perimeter.

16. The apparatus of claim 13, wherein said collision medium is directed toward said collector as droplet streams with droplets, at least some of said streams having a conically-spiralling component and at least some of said streams having a diagonal component corresponding to the intersection of a partial plane and a cone perimeter.

17. The apparatus of claim 13, wherein said debris remaining after said collision is trapped in a manner whereby said remaining debris is retrievable.

18. The apparatus of claim 13, further comprising:
means for separating any debris remaining after said collision from said collision medium.

19. The apparatus of claim 18, further comprising:
means for storing any debris remaining after said collision in a storage means.

20. The apparatus of claim 19, wherein said storing means comprises a plurality of storage receptacles to which said remaining debris is selectively directed.

21. The apparatus of claim 19, further comprising:
means for re-directing said collision medium, after any remaining debris is separated therefrom, in a manner whereby said collsion medium is reuseable to promote hyper-velocity collsions with yet further orbital debris.

22. The apparatus of claim 13, wherein said means for defining said debris intake region is a wall having a conical shape.

23. The apparatus of claim 22, wherein said collision medium is directed from near said inlet of said bounded debris intake.

24. Apparatus for mitigating orbital debris, said apparatus comprising:
means mountable on a space structure for defining a bounded debris intake region, said debris intake region having a mouth to permit the entry of orbital debris therein;
a collision medium provided in said debris intake region, said collision medium including a plurality of filaments mounted on a substrate and oriented to facilitate hyper-velocity collisions;
means mountable on said space structure for trapping any debris remaining after a hyper-velocity collision of orbital debris with said collision medium, said trapping means including other filaments proximate filaments with which said orbital debris collides.

25. The apparatus of claim 24, wherein said collision medium and said remaining debris trapped therein are selectively removable from a superstructure which accommodates said substrate.

26. The apparatus of claim 24, wherein said collision medium and said remaining debris trapped therein is replacable with a further substrate having collision medium provided thereon.

27. The apparatus of claim 24, wherein said means for defining said debris intake region is a wall having a conical shape.

* * * * *